(12) United States Patent
Maurer et al.

(10) Patent No.: US 10,436,353 B2
(45) Date of Patent: Oct. 8, 2019

(54) CONTINUOUS REINFORCED COLD WATER PIPE FOR AN OCEAN THERMAL ENERGY CONVERSION SYSTEM

(71) Applicant: Lockheed Martin Corporation, Bethesda, MD (US)

(72) Inventors: Scott M. Maurer, Haymarket, VA (US); Eugene C. Jansen, Stafford, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 112 days.

(21) Appl. No.: 15/391,236

(22) Filed: Dec. 27, 2016

(65) Prior Publication Data

US 2018/0180200 A1     Jun. 28, 2018

(51) Int. Cl.
| | |
|---|---|
| *F16L 9/128* | (2006.01) |
| *B29C 39/18* | (2006.01) |
| *B29C 39/14* | (2006.01) |
| *B29C 39/00* | (2006.01) |
| *B29C 39/02* | (2006.01) |
| *F03G 7/05* | (2006.01) |

(Continued)

(52) U.S. Cl.
CPC ............ *F16L 9/128* (2013.01); *B29C 39/003* (2013.01); *B29C 39/02* (2013.01); *B29C 39/142* (2013.01); *B29C 39/18* (2013.01); *B29C 70/70* (2013.01); *F03G 7/05* (2013.01); *F16L 1/15* (2013.01); *F16L 9/12* (2013.01); *B29K 2023/065* (2013.01); *B29K 2023/12* (2013.01); *B29K 2023/18* (2013.01); *B29L 2023/22* (2013.01); *Y02E 10/34* (2013.01)

(58) Field of Classification Search
CPC ..................................... F16L 1/15; F16L 9/12
See application file for complete search history.

(56) References Cited

U.S. PATENT DOCUMENTS

| | | | | |
|---|---|---|---|---|
| 3,975,479 A | * | 8/1976 | McClean | ................ B29B 15/10 |
| | | | | 264/102 |
| 4,281,614 A | * | 8/1981 | McNary | .................. B63B 27/36 |
| | | | | 114/264 |

(Continued)

OTHER PUBLICATIONS

International Search Report and Written Opinion for International Patent Application No. PCT/US2017/068474, dated Oct. 15, 2018, 12 pages.

(Continued)

*Primary Examiner* — Benjamin A Schiffman
(74) *Attorney, Agent, or Firm* — Withrow & Terranova, PLLC

(57) ABSTRACT

A continuous reinforced cold water pipe (CWP) for an Ocean Thermal Energy Conversion (OTEC) system is formed from a sequential series of molded pipe sections, which are formed from a series of rigid frame sections and a curable material to form the continuous reinforced CWP. Each molded pipe section is formed by moving a rigid frame section into a mold, enclosing at least a portion of the rigid frame section in the curable material, and curing the curable material. As each molded pipe section is moved out of the mold, the next sequential rigid frame section, which is connected to the previous rigid frame section, is moved into the mold. The cycle is repeated as many times as required to form the continuous reinforced CWP having a desired length.

20 Claims, 5 Drawing Sheets

(51) Int. Cl.
  *F16L 1/15*   (2006.01)
  *F16L 9/12*   (2006.01)
  *B29C 70/70*  (2006.01)
  *B29L 23/00*      (2006.01)
  *B29K 23/00*      (2006.01)

(56) References Cited

U.S. PATENT DOCUMENTS

| | | |
|---|---|---|
| 6,899,842 B1 | 5/2005 | Corre et al. |
| 2011/0120636 A1 | 5/2011 | Bailey et al. |
| 2011/0173978 A1* | 7/2011 | Rekret .................... F03G 7/05 60/641.7 |
| 2011/0272864 A1* | 11/2011 | Miller ................... B29C 70/443 264/557 |
| 2016/0025076 A1 | 1/2016 | Ross et al. |
| 2016/0177928 A1 | 6/2016 | Gaigler et al. |

OTHER PUBLICATIONS

Author Unknown, "Steel Wire Mesh Reinforced HDPE Pipe," Product Brochure, Available at least as early as Dec. 26, 2016 from http://www.roobuck.com/download/Steel%20Wire%20Mesh%20Reinforced%2OHDPE%20Pipe%20Brochure.pdf, Roobuck Pvt Ltd., 2 pages.

International Preliminary Report on Patentability for International Patent Application No. PCT/US2017/068474, dated Jul. 11, 2019, 8 pages.

* cited by examiner

CONTINUOUS REINFORCED COLD WATER PIPE FOR AN OCEAN THERMAL ENERGY CONVERSION SYSTEM

TECHNICAL FIELD

The disclosure relates generally to a continuous reinforced pipe and, more particularly, a continuous reinforced cold water pipe for an Ocean Thermal Energy Conversion system.

BACKGROUND

Ocean Thermal Energy Conversion (OTEC) technology uses the existing temperature differential between ocean water at different depths to generate power. In many OTEC systems, an evaporator uses warm water drawn from near the ocean surface to heat a working fluid (e.g., ammonia), which is used to drive a turbine to generate electrical power. The working fluid is cooled by a condenser that uses cold water drawn from the deep ocean to absorb the heat from the working fluid. The cooled working fluid is then pumped back into the evaporator, and the cycle is repeated.

Many OTEC systems use a cold water pipe (CWP) to collect and transport the cold water from the deep ocean to the condenser, which may be located on an offshore platform or other structure at or near the ocean surface. A CWP may be 1000 meters in length or more and have a diameter of 4 meters or more. A CWP is typically assembled in a vertical orientation from a floating platform and extended into the ocean as the CWP is manufactured. Individual sections of CWP are typically manufactured on shore and are ferried out to the floating platform at significant expense. This is because the large cylindrical sections of CWP take up a large amount of space and are difficult to efficiently transport. Thus, it is desirable to reduce the cost associated with manufacturing CWPs.

In addition, during assembly, a CWP is rigidly coupled to a floating ocean platform and can take up to four months to assemble. CWPs must be designed to withstand the ocean environmental extremes that may occur during the manufacturing process. These environmental design conditions are selected based on the deployment time of individual CWPs. The driving ocean environmental conditions are wave height, wave period, wind speed, and ocean current, which may vary greatly based on seasonal and other conditions. After the CWP is operational and in place under the surface of the water however, the coupling of the CWP to the platform is no longer rigid, and the environmental forces the CWP will be subjected to are diminished. Thus, when building a CWP in a hurricane zone, for example, a longer build time requires the CWP to be built to withstand extreme forces that won't be encountered when in operation. Thus, it is also desirable to minimize build time for manufacturing a CWP.

SUMMARY

The disclosure relates generally to a continuous reinforced pipe and, more particularly, a continuous reinforced cold water pipe (CWP) for an Ocean Thermal Energy Conversion (OTEC) system. In one embodiment, the continuous reinforced CWP is formed from a sequential series of molded pipe sections, which are formed from a series of rigid frame sections and a curable material to form the continuous reinforced CWP. Each molded pipe section is formed by moving a rigid frame section into a mold, enclosing at least a portion of the rigid frame section in a curable material, and curing the curable material. As each molded pipe section is moved out of the mold, the next sequential rigid frame section, which is connected to the previous rigid frame section, is moved into the mold, and the cycle is repeated as many times as required to form the continuous reinforced CWP having a desired length.

One advantage of this embodiment is that the rigid frame sections and molded pipe sections can be constructed on site on an OTEC platform, which reduces the transport costs associated with installing the CWP. Because the rigid material (e.g., galvanized carbon steel, stainless steel, high-strength aluminum alloys, titanium, or the like) used for the rigid frame sections and the curable material (e.g., high-density polyethylene (HDPE), polypropylene, polybutylene, other highly cross-linked polymers, or blends thereof) can be transported to the OTEC platform in bulk, the transport costs are significantly reduced compared to the costs of transporting pre-manufactured CWP sections to the OTEC platform. Another advantage of this embodiment is that the continuous reinforced CWP has a high strength to weight ratio compared to conventional CWPs. As a result, the continuous reinforced CWP may have a reduced weight compared to conventional CWPs while maintaining high bending resistance and resistance to collapsing under the high pressure differential that may exist between the inside and outside of the CWP during operation. Still another advantage of this embodiment is that a CWP of sufficient length (e.g., 500 meters, 1000 meters, or more) can be formed in a relatively short time, which reduces the amount of time the CWP is at risk of being exposed to extreme environmental conditions at the ocean surface. As a result, the environmental design considerations for the CWP may be reduced, further reducing the cost of forming the CWP.

According to one embodiment, a method of forming a continuous reinforced pipe is disclosed. The method includes moving a particular rigid frame section of a plurality of rigid frame sections into a mold. The method further includes enclosing at least a portion of the particular rigid frame section in a curable material. The method further includes curing the curable material to form a particular molded pipe section. The method further includes moving the particular molded pipe section out of the mold, while concurrently moving a next sequential rigid frame section that is connected to the particular rigid frame section into the mold.

According to another embodiment, a reinforced CWP configured to be used in an OTEC system is disclosed. The reinforced CWP includes a continuous rigid frame comprising a first material. The reinforced CWP further includes a continuous coating matrix enclosing the continuous rigid frame to form a continuous molded pipe section, the continuous coating including a second material. The continuous molded pipe section is configured to extend downward into a body of water at least 500 meters.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
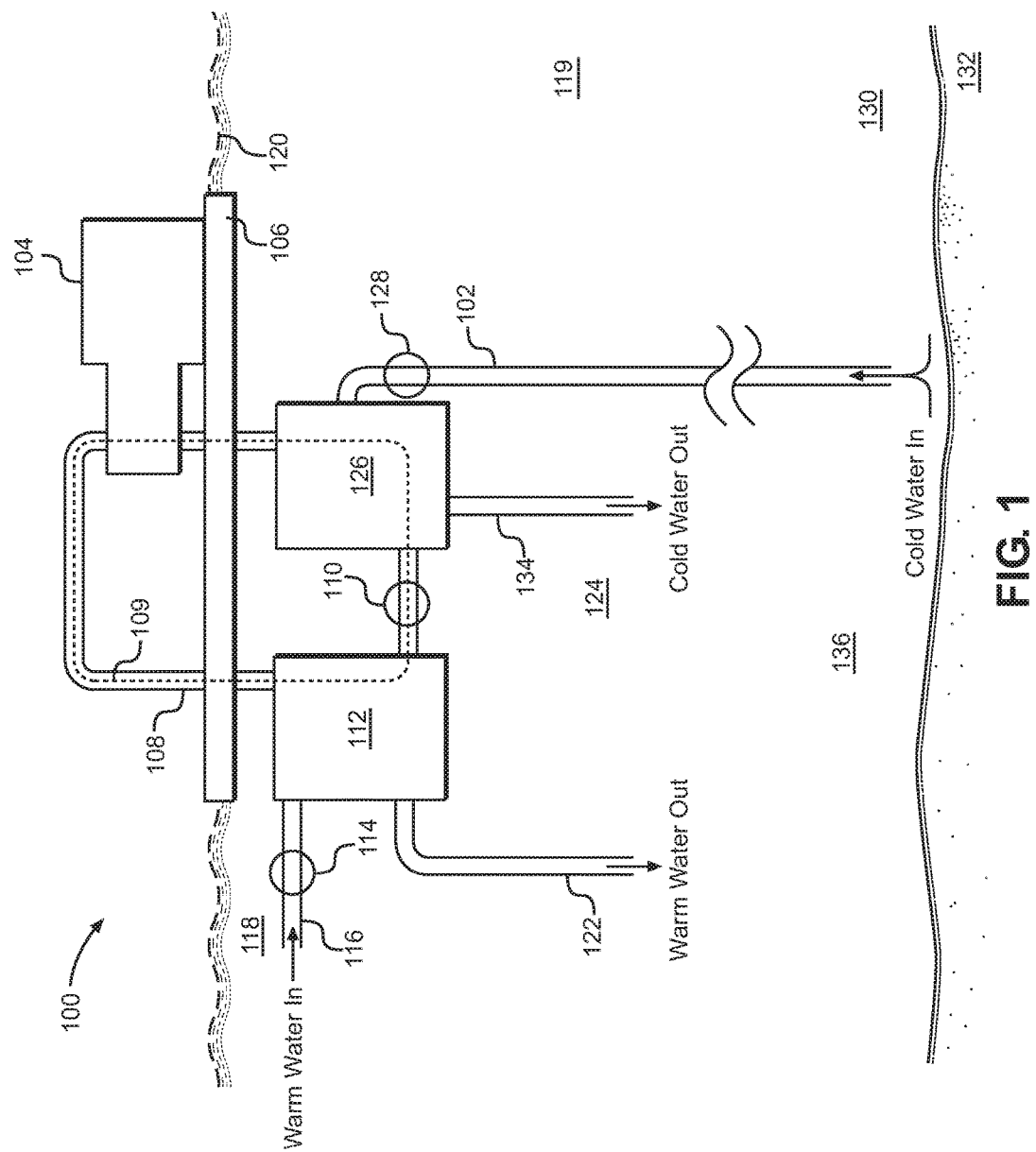
FIG. 1 is a block diagram of an Ocean Thermal Energy Conversion (OTEC) system having a continuous reinforced cold water pipe (CWP) according to an embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first material" and "second material," and does not imply a priority, a type, an importance, or other attribute, unless otherwise stated herein.

As used herein and in the claims, the articles "a" and "an" in reference to an element refers to "one or more" of the element unless otherwise explicitly specified.

The disclosure relates generally to a continuous reinforced pipe and, more particularly, a continuous reinforced cold water pipe (CWP) for an Ocean Thermal Energy Conversion (OTEC) system. In one embodiment, the continuous reinforced CWP is formed from a sequential series of molded pipe sections, which are formed from a series of rigid frame sections and a curable material to form the continuous reinforced CWP. Each molded pipe section is formed by moving a rigid frame section into a mold, enclosing at least a portion of the rigid frame section in a curable material, and curing the curable material. As each molded pipe section is moved out of the mold, the next sequential rigid frame section, which is connected to the previous rigid frame section, is moved into the mold, and the cycle is repeated as many times as required to form the continuous reinforced CWP having a desired length.

One advantage of this embodiment is that the rigid frame sections and molded pipe sections can be constructed on site on an OTEC platform, which reduces the transport costs associated with installing the CWP. Because the rigid material (e.g., galvanized carbon steel, stainless steel, high-strength aluminum alloys, titanium, or the like) used for the rigid frame sections and the curable material (e.g., high-density polyethylene (HDPE), polypropylene, polybutylene, other highly cross-linked polymers, or blends thereof) can be transported to the OTEC platform in bulk, the transport costs are significantly reduced compared to the costs of transporting pre-manufactured CWP sections to the OTEC platform. Another advantage of this embodiment is that the continuous reinforced CWP has a high strength to weight ratio compared to conventional CWPs. As a result, the continuous reinforced CWP may have a reduced weight compared to conventional CWPs while maintaining high bending resistance and resistance to collapsing under the high pressure differential that may exist between the inside and outside of the CWP during operation. Still another advantage of this embodiment is that a CWP of sufficient length (e.g., 500 meters, 1000 meters, or more) can be formed in a relatively short time, which reduces the amount of time the CWP is at risk of being exposed to extreme environmental conditions at the ocean surface. As a result, the environmental design considerations for the CWP may be reduced, further reducing the cost of forming the CWP.

In this regard, FIG. 1 is a block diagram illustrating an OTEC system 100 having a continuous reinforced CWP 102, according to an embodiment. In this embodiment, a turbogenerator 104 is installed on an offshore platform 106. The turbogenerator 104 is disposed in a closed loop conduit 108 for a working fluid 109 (e.g. ammonia). A working fluid pump 110 pumps the working fluid 109 into an evaporator 112, and a warm water pump 114 pumps warm seawater into a portion of the evaporator 112 in thermal communication with the working fluid 109 through a warm water pipe (WWP) 116 located in a surface region 118 of the ocean 119 (or another large body of water) that is relatively close to the waterline 120. The warm water causes the working fluid 109, which has a relatively low boiling point, to evaporate and power the turbogenerator 104. The spent warm seawater is passed through a warm water discharge 122 to a mid-level region 124 of the body of water that is located a distance away from the surface region 118 to avoid thermal contamination of the warm water being drawn from the surface region 118 by the warm water pump 114.

Meanwhile, the working fluid 109 exits the turbogenerator 104 and passes into a condenser 126. A cold water pump 128 pumps cold water from a deep-water region 130 of the body of water, e.g., near a seabed 132 of the body of water, though the continuous reinforced CWP 102, and into a portion of the condenser 126 in thermal communication with the working fluid 109 to cool and condense the working fluid 109. The condensed working fluid 109 is pumped back into the evaporator 112 by the working fluid pump 110, and the cycle repeats. The spent cold water is discharged from the condenser 126 through a cold water discharge 134 into the mid-level region 124 or another region that is located a distance away from the surface region 118 and the deep-water region 130.

As can be seen by FIG. 1, the continuous reinforced CWP 102 must extend downwardly from the condenser 126 to a deployment location 136 in the deep-water region 130, which may be located near the seabed 132 of the ocean 119. Thus, the continuous reinforced CWP 102 must be very long to reach the deployment location 136. For example, in a typical OTEC deployment in a tropical region, the continuous reinforced CWP 102 must extend at least 500 meters, and preferably 1000 meters or more, to reach a sufficiently cold deep-water region 130.

As will be discussed in greater detail below, the continuous reinforced CWP 102 has a reinforced frame made from a rigid material (galvanized carbon steel in this embodiment) enclosed in a curable material that is resistant to corrosion from seawater (HDPE in this embodiment). The reinforced frame helps protect the continuous reinforced CWP 102 against bending and twisting forces from the surrounding seawater currents and also protects the continuous reinforced CWP 102 against external pressure of the seawater, particularly during operation of the cold water pump 128. In this embodiment, because the cold water pump 128 is located at the end of the continuous reinforced CWP 102 proximate the condenser 126, the cold water pump 128 creates significant pressure drop, i.e., suction, inside the continuous reinforced CWP 102. In some conventional CWPs, this pressure differential between the interior and exterior of the CWP can be large enough to collapse the CWP. In this embodiment, however, the rigid frame reinforcement along the length of the continuous reinforced CWP 102 helps protect against this failure mode.

Meanwhile, a curable material in this embodiment encloses the rigid frame along the entire length of the continuous reinforced CWP 102, which protects the rigid frame against seawater corrosion and also protects the continuous reinforced CWP 102 against leaks. As will be described in detail below, sections of the continuous reinforced CWP 102 can be formed as a continuous pipe, with the curable material forming a continuous surface on the inside and outside of the entire length of the continuous reinforced CWP 102.

Figure 2:
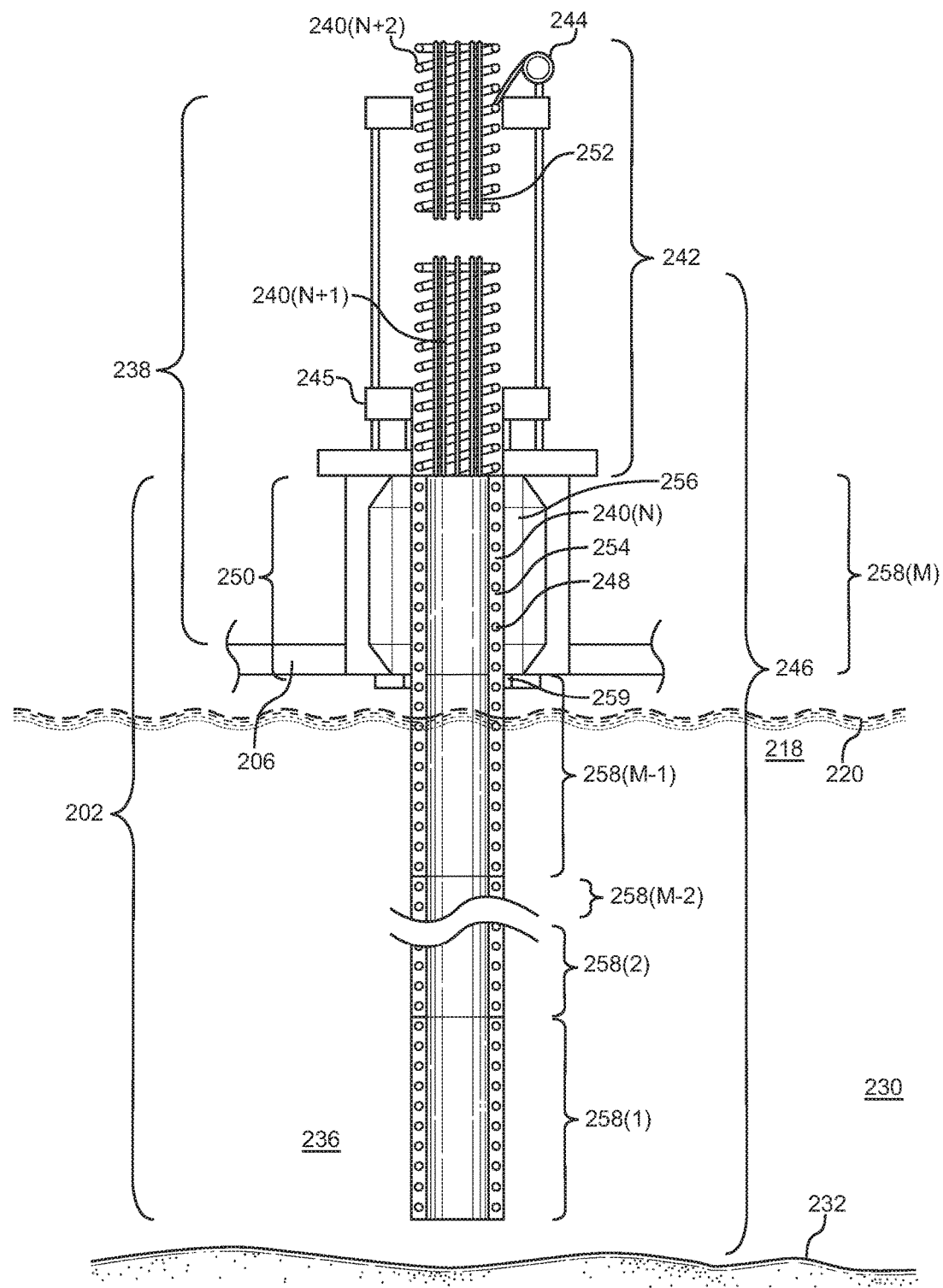
FIG. 2 is a schematic diagram of a mechanism for forming a continuous reinforced CWP similar to the continuous reinforced CWP of FIG. 1, according to an embodiment.

In this regard, FIG. 2 is a schematic diagram illustrating a mechanism 238 for forming a continuous reinforced CWP 202 similar to the continuous reinforced CWP 102 of FIG. 1. The mechanism 238 in this embodiment is installed on an offshore platform 206 for an OTEC installation at or near a waterline 220 of a body of water. In this embodiment, a particular rigid frame section 240(N) of a plurality of rigid frame sections 240 is lowered into a processing section 242 of the mechanism 238 by one or more lowering cables 244. A gripper 245 holds the particular rigid frame section 240(N) in place in the processing section 242, where the particular rigid frame section 240(N) may be cleaned, sandblasted, galvanized, and otherwise pre-processed.

Next, the particular rigid frame section 240(N) is coupled to a previous sequential rigid frame section 240(N−1) disposed below the rigid frame section 240(N) to form a continuous rigid frame unit 246 that includes all the rigid frame sections 240(1)-240(N) of the continuous reinforced CWP 202 that have been sequentially coupled to each other up to that point. The particular rigid frame section 240(N) may be coupled to the previous sequential rigid frame section 240(N−1) by welding, bolting interlocking keyed sections, or any other coupling method as is known in the art.

Some or all of the particular rigid frame section 240(N) is next lowered into a molding compartment 248 of a molding section 250 of the mechanism 238. In some embodiments, the entire particular rigid frame section 240(N) will be contained in the molding section 250, and in other embodiments, portions of the particular rigid frame section 240(N) may be lowered into the molding section 250 in sequence, based on a length of the molding compartment 248. It is also desirable in this embodiment to leave an end 252 of the continuous rigid frame unit 246 exposed so that a next sequential rigid frame section 240(N+1) can be coupled to the end 252 of the continuous rigid frame unit 246 prior to enclosing the end 252 of the continuous rigid frame unit 246 in curable material 254.

With the portion of the continuous rigid frame unit 246 in the molding compartment 248, the curable material 254 is introduced into the molding compartment 248. In this embodiment, the molding compartment 248 is an annular compartment conforming to a desired annular profile of the continuous reinforced CWP 202. It should be understood, however, that other shapes or profiles may be used, as desired. A curing element 256 in proximity to the curable material 254 in the molding compartment 248 may also be used to accelerate curing. In this embodiment, the curing element 256 is a plurality of heating elements arranged around the molding compartment 248 and configured to heat the curable material 254 (HDPE in this embodiment) to accelerate curing of the curable material 254. It should be understood, however, that other types curing elements 256, such as ultraviolet and/or microwave radiation-based curing elements 256 may be used based on the type of curable material 254 being used and the curing characteristics thereof.

After curing is complete, the enclosed portion of the continuous rigid frame unit 246 forms a particular molded pipe section 258(M) that is part of a sequence of molded pipe sections 258(1)-258(M) that make up the continuous reinforced CWP 202. The particular molded pipe section 258(M) may be checked for voids and defects as part of a quality check before moving the particular molded pipe section 258(M) downward below the waterline 220. One or more in-situ void and defect detection sensor(s) 259 may be disposed below the molding section 250 and may include an ultrasonic analyzer for non-destructive detection of defects and/or an image sensor for inspecting the molded surface of the particular molded pipe section 258(M) for calculating thickness and detecting bubbles, internal voids, and/or detrimental surface features.

After the particular molded pipe section 258(M) has been inspected for voids and other defects, the particular molded pipe section 258(M) is lowered out of the molding compartment 248 downward into the body of water, thereby extending the entire continuous reinforced CWP 202 toward a deployment region 236 in the deep-water region 230 of the body of water. Lowering the particular molded pipe section 258(M) out of the molding compartment 248 causes a next sequential portion of the continuous rigid frame unit 246 to be lowered into the molding compartment 248, to be formed into the next sequential molded pipe section 258(M+1) the continuous reinforced CWP 202, with the sequential molded pipe sections 258 integrally connected to each other. In this manner, a continuous reinforced CWP 202 can be formed on site at the offshore platform 206 with a high strength-to-weight ratio, and in a reduced amount of time compared to conventional CWP formation methods.

Figure 3:
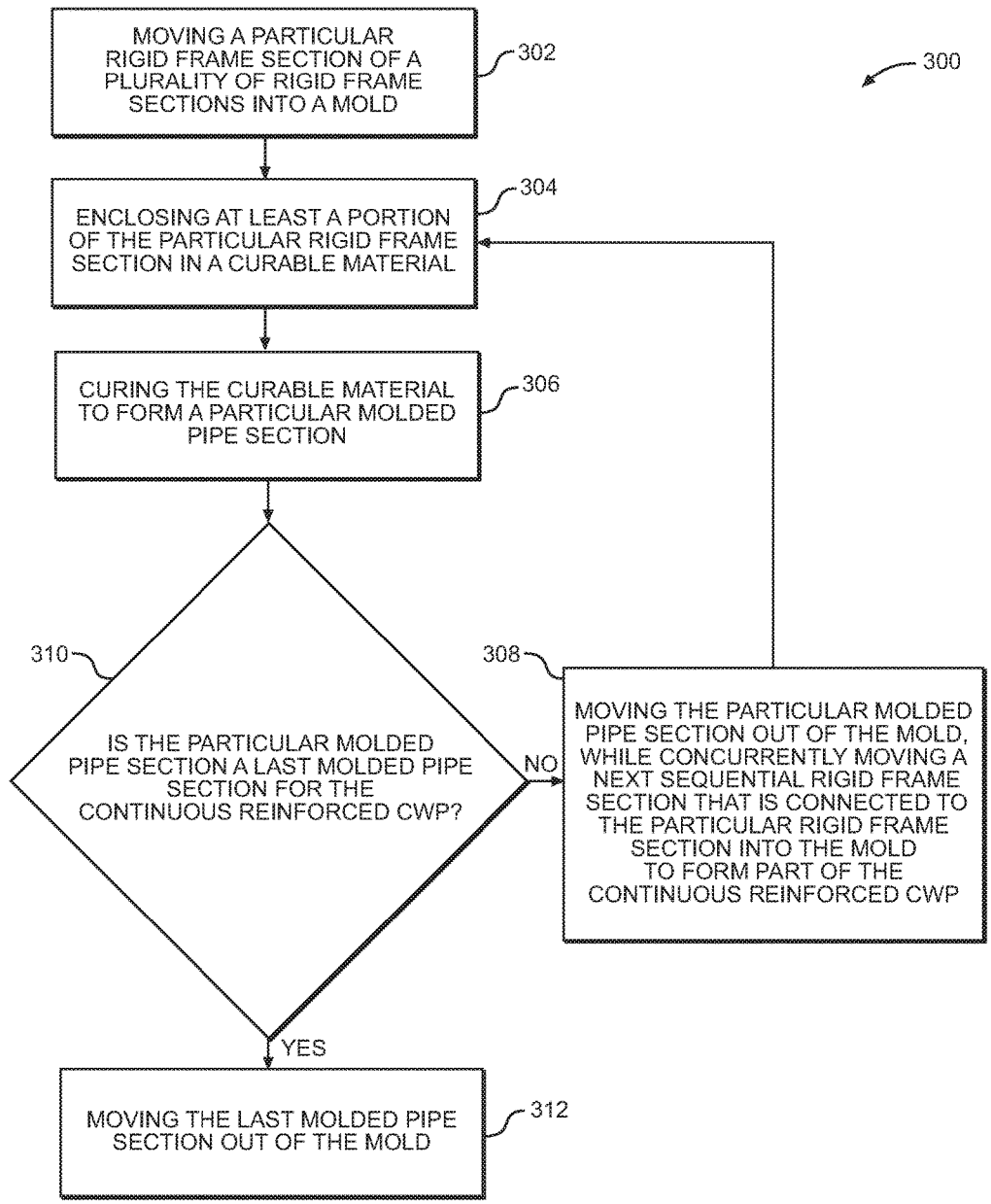
FIG. 3 is a flowchart of a method of forming a continuous reinforced CWP similar to the continuous reinforced CWPs of FIGS. 1 and 2, according to an embodiment.

Referring now to FIG. 3, FIG. 3 is a flowchart illustrating a method 300 of forming a continuous reinforced CWP similar to the continuous reinforced CWPs of FIGS. 1 and 2 is illustrated, according to an embodiment. The method 300 includes moving a particular rigid frame section of a plurality of rigid frame sections, such as the rigid frame section 240 of FIG. 2, for example, into a mold (FIG. 3, block 302). The method further includes enclosing at least a portion of the particular rigid frame section in a curable material, such as the curable material 254 of FIG. 2, for example (FIG. 3, block 304). The method further includes curing the curable material to form a particular molded pipe section, such as the particular molded pipe section 258(M) of FIG. 2, for example (FIG. 3, block 306). The method further includes moving the particular molded pipe section out of the mold, while concurrently moving a next sequential rigid frame section that is connected to the particular rigid frame section into the mold to form part of a continuous reinforced CWP, such as the continuous reinforced CWP 202 of FIG. 2, for example (FIG. 3, block 308), and the process is repeated for each next sequential rigid frame section.

In this embodiment, after each curing step (FIG. 3, block 306), it is determined whether the particular molded pipe section is a last molded pipe section for the continuous reinforced CWP (FIG. 3, block 310). If it is determined that the particular molded pipe section is not the last molded pipe section, the method 300 continues to Block 308, and the process returns to Block 304 and is repeated for the next sequential rigid frame section. If it is determined that the particular molded pipe section is the last molded pipe section, the process proceeds to Block 312, including moving the last molded pipe section out of the mold, and the method 300 ends.

Figure 4A:
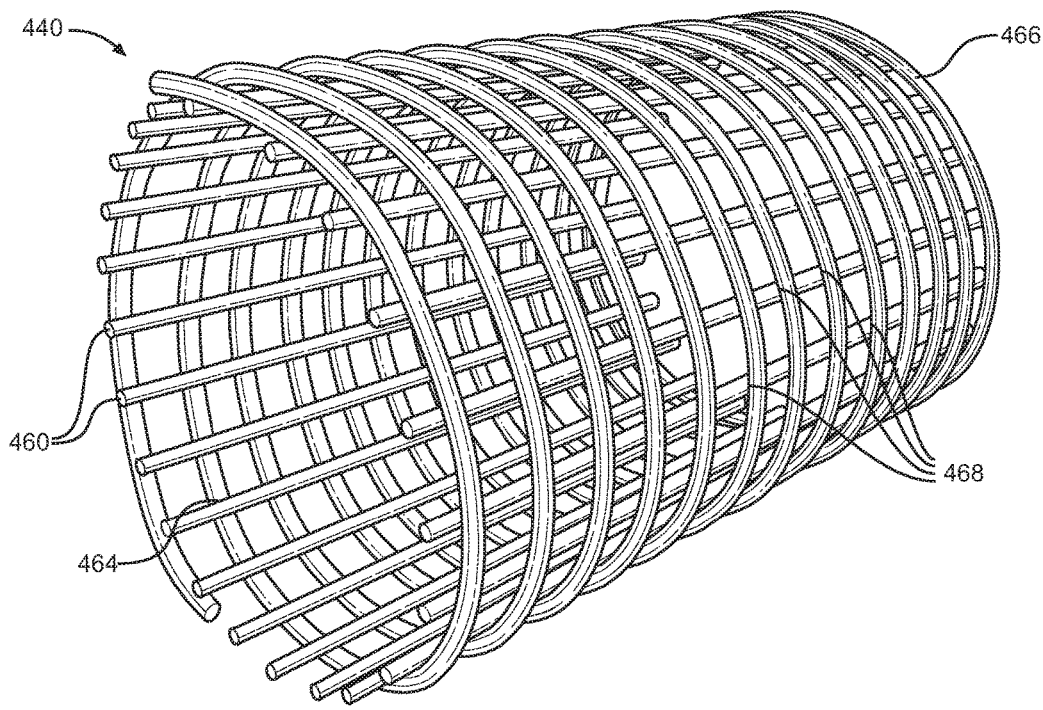
FIGS. 4A and 4B are partial cutaway views of a section of a continuous reinforced CWP showing the rigid frame section therein.
Figure 4B:
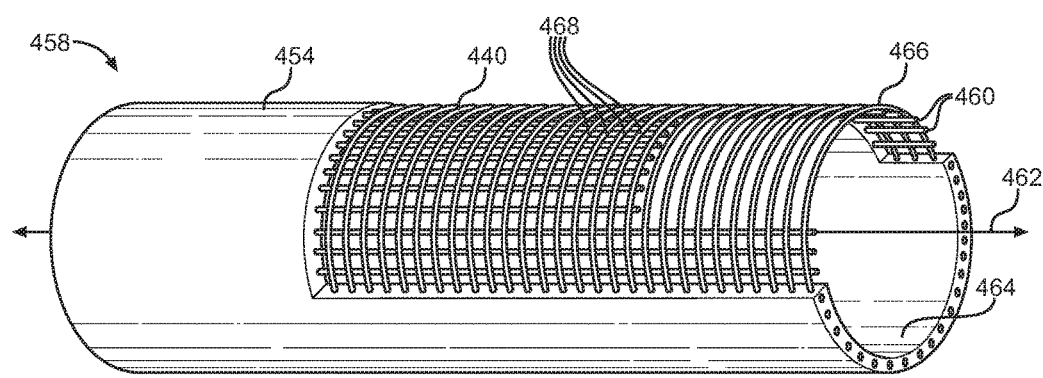

The molded pipe sections disclosed herein, such as the molded pipe sections 258 of FIG. 2, may be designed in a variety of ways to optimize strength, bending and torsional rigidity, weight, or any other structural properties of the molded pipe sections. In this regard, FIGS. 4A and 4B are partial cutaway views illustrating a molded pipe section 458 of a continuous reinforced CWP (not shown) showing a rigid frame section 440 therein. In this embodiment, the rigid frame section 440 comprises a plurality of linear members 460 extending substantially parallel to a longitudinal axis 462 of the rigid frame section 440 to form an interior channel 464 for the sequential rigid frame section 440. The rigid frame section 440 also comprises a pair of helical perimeter member 466 coupled to each of the plurality of linear members 460 and extending around the interior channel 464.

In this example, the perimeter members 466 are continuous members that helically wind around the plurality of linear members 460 to form a rigid cylindrical cage structure that may have an internal diameter of 5 meters, 10 meters, or more. In this example, each intersection 468 between the perimeter member 466 and a linear member 460 is welded or otherwise fixed to secure the perimeter member 466 and linear members 460 together, but it should be understood that it may not be necessary to weld or otherwise fix every intersection 468 in order to form a cylindrical cage structure having sufficient rigidity and other desired structural characteristics.

It should be understood that design of the rigid frame section 440 may vary based on structural and other design constraints. For example, it may be desirable to arrange the linear members 460 outside the helical perimeter members 466, in order to improve performance of the molded pipe section 458 when the outside pressure of the surrounding water exceeds the pressure inside the molded pipe section 458, e.g., when the molded pipe section 458 is under suction. In another embodiment, the linear members 460 and the helical perimeter members 466 may be interwoven with each other.

FIG. 4B also shows a curable material 454 disposed around the rigid frame section 440 such that the rigid frame section 440 is entirely enclosed by the curable material 454. This has the advantage of protecting the rigid frame section 440 against seawater corrosion, and also forms a continuous smooth interior surface for the molded pipe section 458, which may reduce the risk of leaks and may facilitate smoother, less turbulent flow through the molded pipe section 458 leading to lower pressure drop, which in turn allows for a cold water pump, such as the cold water pump 128 of FIG. 1, to use less energy to move an amount of cold water through the molded pipe sections 458 of the continuous reinforced CWP (not shown).

Figure 5:
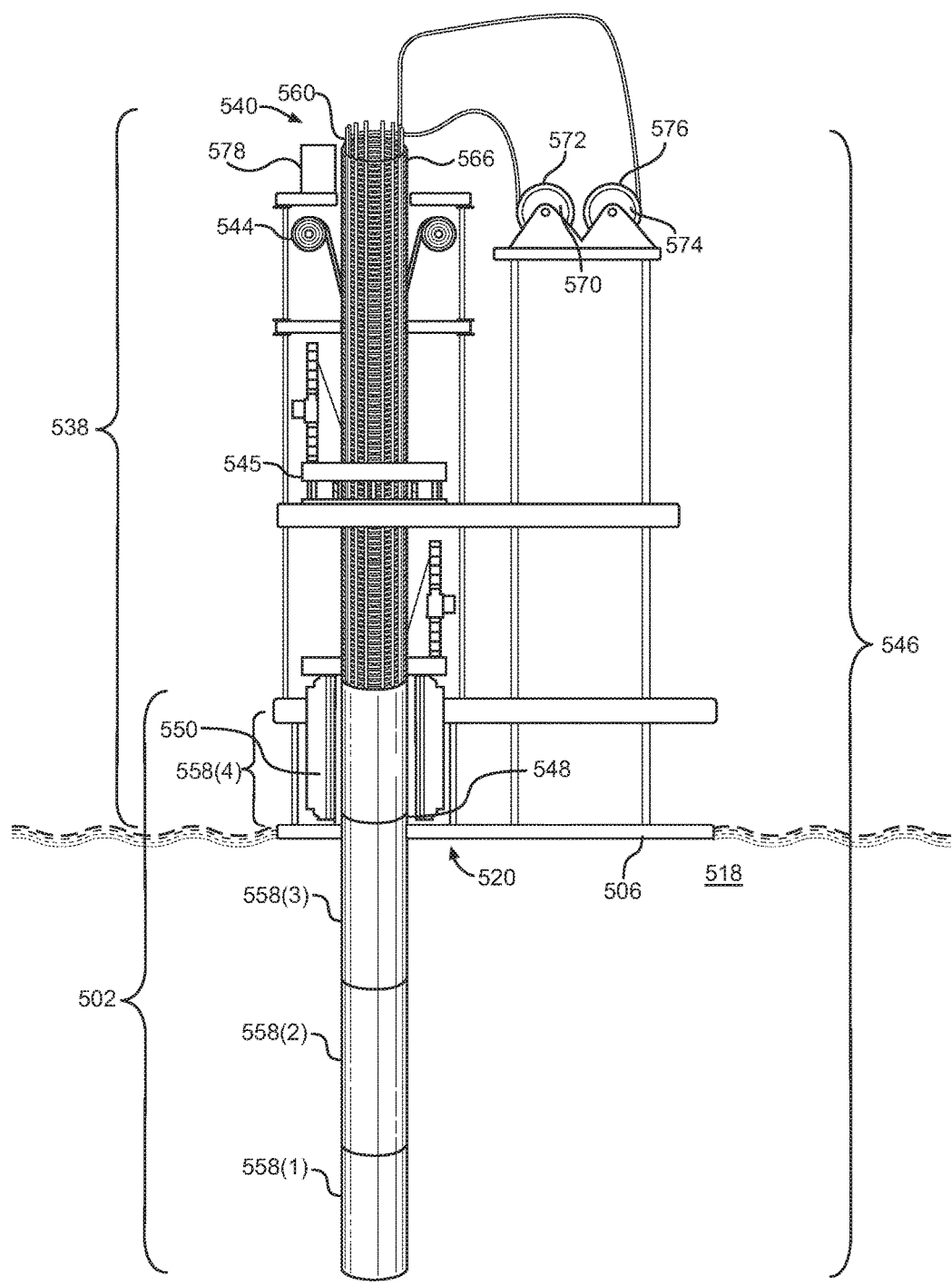
FIG. 5 is a schematic diagram of a mechanism for forming a continuous reinforced CWP similar to the continuous reinforced CWPs of FIGS. 1-4B, wherein the rigid frame sections are continuously formed as part of a continuous rigid frame unit during formation of the continuous reinforced CWP.

As noted above, the perimeter member 466 in this embodiment is a continuous helical member but it should be understood that other types of perimeter members 466 may be used, such as a plurality of circular members extending around the linear members 460, for example. However, forming the perimeter member as a continuous helical member has additional benefits, which will be discussed below with respect to FIG. 5. In this regard, FIG. 5 is a schematic diagram illustrating a mechanism 538 for forming a continuous reinforced CWP 502 similar to the continuous reinforced CWPs 102, 202, and 402 of FIGS. 1-4B, wherein rigid frame sections 540 of the continuous reinforced CWP 502 are continuously formed as part of the continuous rigid frame unit 546 during formation of the continuous reinforced CWP 502. In this embodiment, rather than lowering separate sequential rigid frame sections, such as the rigid frame sections 240 of FIG. 2, into the mechanism 538, each linear member 560 is fed into the mechanism 538 from a reel mechanism 570 having a continuous spool 572 of a frame material. In this example, only one reel mechanism 570 is shown, but it should be understood that a separate reel mechanism 570 may be provided for each of the linear members 560. A helical perimeter member 566 is also fed into the mechanism 538 from a reel mechanism 574 having a continuous spool 576 of material. A winding mechanism 578 winds the material from the spool 576 around the linear members 560 in the mechanism 538 to form the continuous rigid frame unit 546 that can be formed on site on an offshore platform 506 quickly and efficiently. This has the advantage of allowing the raw materials to be transported to the offshore platform 506 in an efficient and cost-effective manner, and also allows the mechanism 538 to produce a much longer continuous rigid frame unit 546, which in turn increases the structural integrity of the continuous reinforced CWP 502.

Those skilled in the art will recognize improvements and modifications to the preferred embodiments of the disclosure. All such improvements and modifications are considered within the scope of the concepts disclosed herein and the claims that follow.

What is claimed is:

1. A method of forming a continuous reinforced pipe, comprising:
   (a) moving a particular rigid frame section of a plurality of rigid frame sections into a mold, the particular rigid frame section comprising a plurality of linear metallic members extending parallel to one another and spaced apart from one another, the plurality of linear metallic members defining an interior channel;
   (b) enclosing the particular rigid frame section in a curable material, the curable material contacting and completely surrounding an exterior surface of each of the linear metallic members of the particular rigid frame section and forming a surface that defines an interior wall of the interior channel;
   (c) curing the curable material to form a particular molded pipe section; and
   (d) moving the particular molded pipe section out of the mold, while concurrently moving a next sequential rigid frame section that is connected to the particular rigid frame section into the mold.

2. The method of claim 1, further comprising:
   sequentially repeating (b)-(d) to form a plurality of molded pipe sections as part of a continuous pipe.

3. The method of claim 2, wherein moving the particular molded pipe section out of the mold further comprises lowering the particular molded pipe section downward toward a body of water, thereby extending the continuous pipe downward into the body of water a predetermined distance.

4. The method of claim 3, wherein the predetermined distance is at least 500 meters.

5. The method of claim 3, wherein the predetermined distance is at least 1000 meters.

6. The method of claim 1, wherein each rigid frame section of the plurality of rigid frame sections comprises:
   a plurality of linear members extending substantially parallel to a longitudinal axis of the rigid frame section; and
   at least one perimeter member coupled to each of the plurality of linear members, the plurality of linear members and the at least one perimeter member forming the interior channel.

7. The method of claim 6, wherein the at least one perimeter member is a plurality of circular members.

8. The method of claim 6, wherein the at least one perimeter member is at least one helical member.

9. The method of claim 6, wherein the interior channel has an internal diameter of at least 5 meters.

10. The method of claim 6, wherein the interior channel has an internal diameter of at least 10 meters.

11. The method of claim 1, wherein each rigid frame section comprises at least one of the group consisting of: steel, titanium, and aluminum.

12. The method of claim 1, wherein enclosing the particular frame section in the curable material comprises:
    disposing the curable material into the mold;
    melting the curable material; and
    curing the curable material.

13. The method of claim 12, wherein the curable material comprises at least one of the group consisting of: high-density polyethylene (HDPE), polypropylene, and polybutylene.

14. The method of claim 1, further comprising, for each next sequential rigid frame section, coupling the next sequential rigid frame section to the particular rigid frame section prior to moving the particular molded pipe section out of the mold.

15. The method of claim 14, wherein coupling the next sequential rigid frame section to the particular rigid frame section comprises one of welding the next sequential rigid frame section to the particular rigid frame section or interlocking an end of the next sequential rigid frame section to an end of the particular rigid frame section.

16. The method of claim 14, wherein coupling the next sequential rigid frame section to the particular rigid frame section comprises coupling the next sequential rigid frame section to a remaining unenclosed portion of the particular rigid frame section.

17. The method of claim 16, wherein enclosing the particular rigid frame section in the curable material further comprises enclosing the remaining unenclosed portion of a previous sequential rigid frame section in the curable material.

18. The method of claim 1, further comprising, for each next sequential rigid frame section, forming the next sequential rigid frame section as part of a continuous rigid frame unit with the particular rigid frame section prior to moving the next sequential rigid frame section into the mold.

19. The method of claim 18, wherein forming the next sequential rigid frame section as part of the continuous rigid frame unit with the particular rigid frame section comprises providing a continuous length of a frame material to form the continuous rigid frame unit.

20. The method of claim 1 further comprising:
    generating the particular rigid frame section by:
      generating a continuous helical member from a spool of frame material; and
      welding the plurality of linear metallic members to an exterior of the continuous helical member.

\* \* \* \* \*